United States Patent

[11] 3,562,540

[72] Inventor James Arthur Hirsch
Indianapolis, Ind.
[21] Appl. No. 816,178
[22] Filed Apr. 10, 1969
[45] Patented Feb. 9, 1971
[73] Assignee P.R. Mallory & Co., Inc.
Indianapolis, Ind.
a corporation of Delaware
Continuation of application Ser. No.
530,713, Feb. 28, 1966.

[54] APPLIANCE WITH SOLID-STATE LIGHT-ACTUATED CONTROL MEANS
5 Claims, 1 Drawing Fig.

[52] U.S. Cl. .......... 250/227, 250/208, 250/220

[51] Int. Cl. .......... Holj 5/16, H03k 19/52

[50] Field of Search .......... 328/2, 48, 3, 4, 12; 315/217, 227, 152, 153, 154, 155; 250/215, 217; 318/480, 483, 478

[56] References Cited

UNITED STATES PATENTS

| | | | |
|---|---|---|---|
| 3,058,002 | 10/1962 | Sihvonen | 250/227 |
| 3,116,982 | 1/1964 | McIlvaine | 200/61.02 |
| 3,213,179 | 10/1965 | Clauson | 250/227X |
| 3,284,715 | 11/1966 | Kaminsky | 328/41 |
| 3,353,026 | 11/1967 | Israely | 250/227 |
| 3,360,657 | 12/1967 | Shlesinger | 250/227 |
| 3,213,179 | 10/1965 | Clauson | 84/1.03 |

*Primary Examiner*—Roy Lake
*Assistant Examiner*—V. Lafranchi
*Attorneys*—Robert F. Meyer and Richard H. Childress

ABSTRACT: A light-actuated solid-state control means for an appliance employing solid-state switching devices for programming the sequence of operations of the appliance.

PATENTED FEB 9 1971 3,562,540
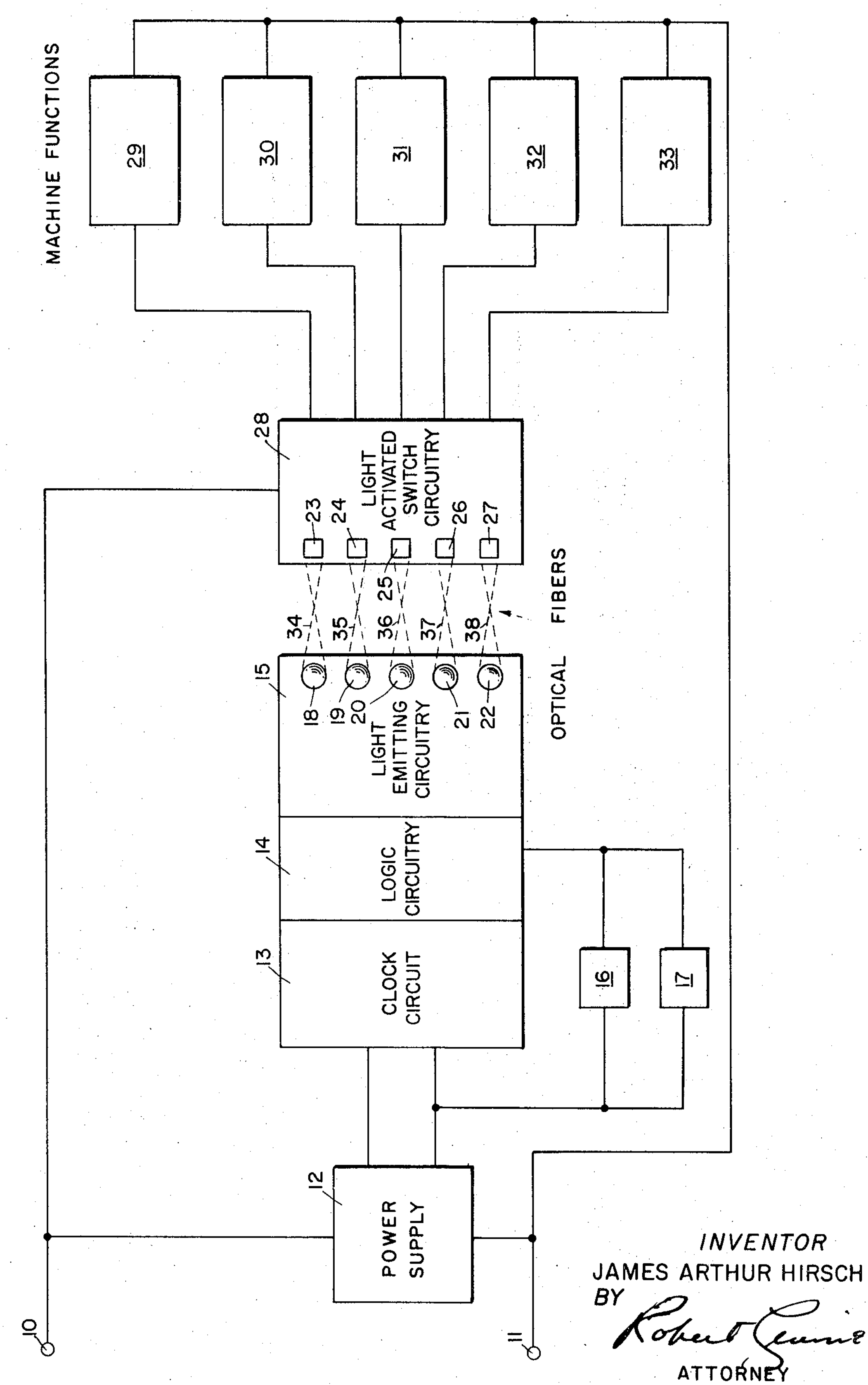
*INVENTOR*
JAMES ARTHUR HIRSCH
*BY* Robert [signature]
ATTORNEY

APPLIANCE WITH SOLID-STATE LIGHT-ACTUATED CONTROL MEANS

This is a continuation of application Ser. No. 530,713, filed Feb. 28, 1966 and now abandoned.

The present invention relates to control systems for appliances and more particularly to the means and methods for providing a solid state control system for an appliance.

The control system of the present invention is characterized by the use of light-actuated solid-state switches for coupling elements of an appliance to an appropriate power source and a control means consisting of clock circuitry, logic circuitry, and light emitting circuitry. As shown in the illustrative embodiment, various types of sensors can be used to control the logic circuitry.

The clock circuit of the illustrative embodiment is a means for providing timing for control operations which may be fully or partially time dependent. In a sophisticated version of the present invention, the clock circuit can be an integrated circuit which would count cycles of line power to provide a timing base.

The logic circuitry of the present invention, which can also be fabricated by integrated circuit techniques, will accept inputs from the clock circuitry an and various sensors to produce outputs which will illuminate the proper light-actuated switch at the proper time. A further input to the logic circuitry can be the introduction of a magnetic field at or near portions of the integrated circuitry to change resistances, thereby accomplishing different program sequences. This effect, changing the resistance of a mass by the introduction of a magnetic field, is commonly referred to as the Hall Effect. A memory capability, as required for the logic circuitry, can be obtained by the deposition of a magnetic material on a substrate coupled to the integrated circuitry.

Because the control switches are light actuated, electrical isolation between the logic circuitry and the switching circuitry is achieved. This feature is very attractive because of the various safety requirements placed upon any appliance control.

In the most sophisticated version of the present invention, the light-emitting circuitry can be a series of light-emitting diodes, or similar devices, formed either on, or in, an integrated circuit substrate and coupled to the outputs of the logic circuitry. These light-emitting devices would be disposed on the substrate as to face an associated light-actuated switch formed in another substrate. The two substrates can be separated by a thin layer of electrically insulating material which will pass the light from the light-emitting devices to the light-actuated switches. In another configuration, the light may be passed from the light emitting devices to the light-actuated switches via an optical fiber system. The optical fibers can be interchangeable to permit switching of outputs in order to change the programming of the control system. Such an interchangeable optical fiber system can also be used to couple one or more of the light outputs back into the logic circuitry to provide another form of programming feedback.

In the configurations where optical fibers are used, the requirements for a magnetoresistive network, which may be somewhat difficult to operate, may be lessened.

The control system of the present invention, as hereinbefore briefly described, is a means for controlling the programmed operation of an appliance such as an automatic washing machine.

In present day automatic washing machines, the control system includes a timer of the type having a plurality of control cams mounted on a camshaft so as to be rotated thereby and a plurality of control switches adapted to be operated by the rotation of said control cams. An electric motor is adapted to rotate the camshaft of the timer at a substantially constant speed. Thus, the control switches are operated in a time-sequence relationship by the rotation of the control cams. Each control switch is electrically connected to an element of the appliance. For instance, one of the control switches is connected to a solenoid-operated valve to permit filling of the washing machine at predetermined times. In many cases, a pressure switch sensor is provided to close the valve when the washer is filled to a predetermined level. In a similar manner, the washer progresses from the fill cycle, to the wash cycle, to the rinse cycle, to the spin cycle, etc.

The control system of the present invention would replace the timer in an automatic washing machine.

It is an object of the present invention, therefore, to provide a control system for an appliance that employs light-actuated switches for switching in a programmable sequence the elements of said appliance, said light-actuated switches being energized by light emitted from the output of a control circuit.

It is another object of the present invention to provide a control circuit for sequentially actuating a plurality of light-actuated switches, said control circuit consisting of a clock circuit, a logic circuit, a plurality of sensors connected to said logic circuit, and a plurality of light emitting devices connected to said logic circuitry.

It is a further object of the present invention to provide a control means for an appliance which employs light-actuated switches for connecting elements of said appliance to a proper power source and light emitting devices for actuating said switches.

It is still another object of the present invention to provide a control circuit for an appliance which can be fabricated by integrated circuit techniques.

It is still a further object of the present invention to provide a control circuit for an appliance which includes an integrated clock circuit for counting cycles of line power to provide a timing base for said control circuits.

The present invention, in another of its aspects, relates to novel features of the instrumentalities described herein for teaching the principal object of the invention and to the novel principles employed in the instrumentalities whether or not these features and principles may be used in the said object and/or in the said field.

Other objects of the invention and the nature thereof will become apparent from the following description considered in conjunction with the accompanying drawings and wherein like reference numbers describe elements of similar function therein and wherein the scope of the invention is determined rather from the dependent claims.

For illustrative purposes, the invention will be described in conjunction with the accompanying drawings in which:

FIG. 1 is a block diagram of the present invention showing the cooperative relationship of the power supply, clock circuitry, logic circuitry, light-emitting circuitry, and light-actuated switches. Also shown in FIG. 1 are optional sensors connected to the logic circuitry, optional optical fibers for coupling the light emitting circuitry to the light-actuated switches, and a plurality of machine functions connected between the light-actuated switches and the power source.

Generally speaking, the present invention is a control system for an appliance comprising; a power supply; a clock circuit for providing a time-based output, said clock circuit being coupled to said power supply; a plurality of light-emitting devices; a plurality of logic circuits for coupling said light-emitting devices to said clock circuit so as to energize said light-emitting devices at predetermined times; and a plurality of light-actuated switches for operating elements of said appliance, each of said light-actuated switches being disposed adjacent to an associated light-emitting device so as to be actuated when said light-emitting devices are energized.

More specifically, the present invention is a means for controlling elements of an appliance comprising: an alternating current power source; a power supply circuit for providing a direct current voltage, said power supply circuit being connected across said alternating current power os source; a clock circuit for providing a time based output, said clock circuit being coupled to said power supply; a plurality of light-emitting devices; a plurality of logic circuits for coupling said light-emitting devices to aid clock circuit, thereby energizing said light-emitting devices at predetermined times; and a plurality of light-actuated switches for connecting said elements of said appliance to said alternating current power source, each of said light-actuated switches being disposed adjacent to an associated light-emitting device so as to be actuated when said light-emitting devices are energized.

Referring now to FIG. 1 of the drawing, the circuitry of the present invention can be visualized in conjunction with the following description.

The input power for the appliance and, consequently, the control system of the present invention is provided across the terminals 10 and 11. For illustrative purposes, the power source across the terminals 10 and 11 can be a 60 cycle, 110 volt source. A power supply circuit 12 is coupled across the terminals 10 and 11 to provide a proper voltage for operating the clock circuit 13, logic circuitry 14, and light emitting circuitry 15.

There are five light-emitting devices 18 through 22 included in the light-emitting circuitry 15 which are disposed so as to project light on five light-actuated switches 23 through 27 of the light-actuated switch circuitry 28. Each of the light-actuated switches 23 through 27 is connected to a machine function 29 through 33 so as to connect said machine functions to the power source (terminal 10) when said switches are actuated by light from the light-emitting devices 18 through 22.

The light-emitting devices 18 through 22 can be glow lamps which are connected in a relaxation-oscillator circuit so as to discharge a capacitor after a predetermined time interval. As stated previously, in a sophisticated control system, the light-emitting devices 18 through 22 can be light-emitting diodes.

For most appliance applications, the light-actuated switches 23 through 27 would be light-actuated, at alternating current power switches. Such a switch, being solid-state, will conduct current in both directions through said switch when light is directed on the junctions thereof. In many cases, it is conceivable that a light-actuated, direct current switch can be used in the present invention.

The machine function 29 through 33 can be any functions or elements of an appliance which would ordinarily have to be sequentially controlled. For instance, in an automatic washing machine, the function 29 could be the solenoid-actuated valve for filling the washer, the function 30 could be the means for agitating the clothes, the function 31 could be the means for rinsing the clothes, the function 32 could be the means for spinning the clothes, and the function 33 could be the means for removing the water from the washer.

The control system of the present invention can be further expanded by addition of the sensing elements 16 and 17 to control portions of the logic circuitry 14. Such sensors can take a variety of forms. For instance, the sensor 16 could be a moisture-sensitive device that would conduct current in the presence of moisture to provide an input to the logic circuitry 11. Such a moisture sensitive device would find application in an automatic washer or dryer. Similarly, the sensor 17 could be a temperature-sensitive resistor for measuring the temperature of the water.

Optical fiber means 34 through 38 are shown as an optional feature in FIG. 1. The optical fibers 34 through 38 are used to couple the light output of the light-emitting devices 18 through 22 to the light-actuated switches 23 through 27 respectively.

One method of programming the control system of the present invention is to use a fixed set of light paths with a gap into which a punched card may be inserted. Insertion of the punched card blocks some light paths and leaves others open, causing operations not to occur and to occur respectively. Such a gap could also be used in an optical fiber system.

Another manner in which programming may take place is to move the light-actuated switches 23 through 27 a small distance with respect to the light-emitting devices 18 through 22. Thus, the light would fall on insensitive areas of the switches that are moved and said switches would not conduct.

The control system of the present invention can readily be fabricated using discrete transistors, diodes, resistors, capacitors, light-actuated switches and glow lamps. Although the logic circuitry can take many forms and include OR gates, AND gates, NOR gates, NAND gates, etc., a suitable logic network has been fabricated by the inventor using NAND gates almost exclusively. Since logic networks are well known in the art of electronics, it is not necessary to further describe the logic circuits in this specification.

The control circuit of the present invention may be operated without the clock circuit 15 provided there are sufficient sensors located in the appliance and connected to the logic circuitry 14 so as to advance the logic circuitry through the programmed control cycle.

The control system of the present invention, as hereinbefore described in one of its embodiments, is merely illustrative and not exhaustive in scope. Since many widely different embodiments of the invention may be made without departing from the scope thereof, it is intended that all matter contained in the above description and shown in the accompanying drawing shall be interposed as illustrative and not in a limiting sense.

I claim:

1. An appliance comprising:

a. machine function means operating elements of said appliance, b. light-actuated solid state switching means coupled to said machine function;

c. light-emitting means adjacent said light-actuated switch means;

d. logic circuitry means coupled to said light-emitting means;

e. clock circuit means coupled to said logic circuitry;

f. power supply means coupled to said clock circuitry; and g. sensor means coupled between said logic circuitry and said power supply means for controlling said logic circuit according to a predetermined condition in said appliance, whereby energizing said light means through said clock circuitry means and said logic circuitry means for selectively energizing said solid state switching means so as to selectively energize said machine functions.

2. An appliance according to claim 1, further including optical fiber means coupling the light-emitting means to said switching means.

3. An appliance according to claim 1, wherein said light-emitting means are light-emitting diodes.

4. An appliance according to claim 3, wherein said light-emitting diodes and said logic means are integrated circuits.

5. An appliance according to claim 2, wherein said optical fiber means are interchangeable between said light-emitting means and said solid-state switching means and wherein the outputs of said light-emitting means are coupled by said optical fiber means to said logic means whereby additional means for programming said control means is provided.